(12) United States Patent
Bisaiji et al.

(10) Patent No.: US 9,157,354 B2
(45) Date of Patent: Oct. 13, 2015

(54) EXHAUST GAS PURIFICATION APPARATUS FOR INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 13/639,559

(22) PCT Filed: Apr. 8, 2010

(86) PCT No.: PCT/JP2010/056388
§ 371 (c)(1),
(2), (4) Date: Oct. 5, 2012

(87) PCT Pub. No.: WO2011/125205
PCT Pub. Date: Oct. 13, 2011

(65) Prior Publication Data
US 2013/0028795 A1  Jan. 31, 2013

(51) Int. Cl.
*B01D 53/94* (2006.01)
*F01N 3/10* (2006.01)
*F01N 3/08* (2006.01)
*F01N 3/023* (2006.01)
*F01N 3/035* (2006.01)
*F01N 3/20* (2006.01)

(52) U.S. Cl.
CPC ........... *F01N 3/0814* (2013.01); *F01N 3/0231* (2013.01); *F01N 3/035* (2013.01); *F01N 3/0821* (2013.01); *F01N 3/0885* (2013.01); *F01N 3/2066* (2013.01); *F01N 2610/02* (2013.01); *F01N 2610/03* (2013.01); *F01N 2900/1612* (2013.01); *Y02T 10/24* (2013.01)

(58) Field of Classification Search
None
See application file for complete search history.

(56) References Cited

U.S. PATENT DOCUMENTS

| | | | |
|---|---|---|---|
| 6,701,707 B1 * | 3/2004 | Upadhyay et al. | 60/277 |
| 7,134,273 B2 * | 11/2006 | Mazur et al. | 60/286 |
| 2004/0040289 A1 | 3/2004 | Mazur et al. | |
| 2007/0277513 A1 * | 12/2007 | Yoshida et al. | 60/299 |

(Continued)

FOREIGN PATENT DOCUMENTS

| | | |
|---|---|---|
| JP | A-2004-100700 | 4/2004 |
| JP | A-2006-102628 | 4/2006 |
| JP | A-2009-47095 | 3/2009 |

(Continued)

*Primary Examiner* — Walter D Griffin
*Assistant Examiner* — Jelitza Perez
(74) *Attorney, Agent, or Firm* — Oliff PLC (57) ABSTRACT

An exhaust gas purification apparatus for an internal combustion engine comprises a NOx selective reduction catalyst provided in an exhaust passage of an internal combustion engine; an upstream side oxidation catalyst which is a catalyst having an oxidizing ability provided in the exhaust passage upstream from the NOx selective reduction catalyst and which includes a carrier for carrying a noble metal for oxidation, the carrier being formed of a basic carrier; and a reducing agent supply until which supplies a reducing agent to an exhaust gas allowed to flow into the NOx selective reduction catalyst. Accordingly, even when the oxidation catalyst causes the SOx poisoning in the exhaust gas purification apparatus for the internal combustion engine having the oxidation catalyst and the NOx selective reduction catalyst provided in the exhaust passage, the reduction efficiency of NOx reduced by the aid of the NOx selective reduction catalyst is favorably maintained.

2 Claims, 5 Drawing Sheets (56) References Cited

U.S. PATENT DOCUMENTS

2010/0122527 A1* 5/2010 Fukuda et al. .......... 60/286
2010/0139259 A1  6/2010 Hirota et al.

FOREIGN PATENT DOCUMENTS

JP    A-2010-38020        2/2010
WO    WO 2009017228 A1 *  2/2009

* cited by examiner

EXHAUST GAS PURIFICATION APPARATUS FOR INTERNAL COMBUSTION ENGINE

TECHNICAL FIELD

The present invention relates to an exhaust gas purification apparatus for an internal combustion engine.

BACKGROUND ART

A NOx selective reduction catalyst is used in some cases in order to purify NOx contained in the exhaust gas discharged or exhausted from an internal combustion engine. In relation to the NOx selective reduction catalyst, it is known that the reduction efficiency of NOx varies depending on the ratio between NO and $NO_2$ contained in the exhaust gas. Accordingly, a technique is disclosed, in which the amount of urea as a reducing agent supplied to the exhaust gas is controlled based on the ratio between NO and $NO_2$ contained in the exhaust gas (see, for example, Patent Document 1). In the case of this technique, an oxidation catalyst is provided on the upstream side from a selective catalytic reduction NOx catalyst in order that the ratio between NO and $NO_2$ in the exhaust gas is about 1:1. Further, the supply of urea to the exhaust gas is controlled based on the concerning ratio, and thus it is aimed to perform the efficient NOx purification.

When the oxidation catalyst and the NOx selective reduction catalyst are successively arranged in the flow of the exhaust gas as described above, if the oxidation catalyst is in a state of being poisoned with SOx contained in the exhaust gas, then the oxidizing ability is lowered. Therefore, it is difficult to provide a desired value of the ratio between NO and $NO_2$ contained in the exhaust gas allowed to flow into the NOx selective reduction catalyst. In view of the above, a technique is disclosed, in which a NOx adsorbing catalyst is provided on the more upstream side of the oxidation catalyst, SOx contained in the exhaust gas is adsorbed thereby, and thus the oxidizing ability of the oxidation catalyst is suppressed from being lowered (see, for example, Patent Document 2).

PRECEDING TECHNICAL DOCUMENTS

Patent Documents

Patent Document 1: Japanese Patent Application Laid Open Publication No. 2004-100700
Patent Document 2: Japanese Patent Application Laid Open Publication No 2009-47095

SUMMARY OF THE INVENTION

The Problems to be Solved by the Invention:

As described above, it is known that the reduction efficiency of NOx varies when NOx is purified with the NOx selective reduction catalyst, depending on the ratio between NO and $NO_2$ contained in the exhaust gas allowed to flow thereinto. In the meantime, the oxidation catalyst is provided on the upstream side from the NOx selective reduction catalyst, and NO contained in the exhaust gas is oxidized to $NO_2$. Accordingly, the ratio between NO and $NO_2$ provided therein is allowed to have a value at which the reduction efficiency is satisfactory. However, if the oxidizing ability is lowered due to the SOx poisoning of the oxidation catalyst, then the ratio between NO and $NO_2$ contained in the exhaust gas is deviated from the desirable value, and the reduction efficiency of the NOx selective reduction catalyst is consequently lowered or deteriorated.

In such a situation, when the oxidizing ability of the oxidation catalyst is lowered, the supply amount of the reducing agent supplied to the exhaust gas is increased in order to maintain the reduction efficiency brought about in relation to the NOx selective reduction catalyst. As a result, the amount of reducing component accumulated in the NOx selective reduction catalyst is increased. Therefore, the reducing component flows out to the downstream side of the NOx selective reduction catalyst. For example, it is feared that any unfavorable influence may be exerted on the external environment and/or the reducing agent may be consumed uselessly.

The present invention has been made taking the foregoing problem into consideration, an object of which is to favorably maintain the reduction efficiency of NOx to be reduced by the aid of a NOx selective reduction catalyst even when an oxidation catalyst causes the SOx poisoning in an exhaust gas purification apparatus for an internal combustion engine having the oxidation catalyst and the NOx selective reduction catalyst provided in an exhaust passage.

Means for Solving the Problems

In the present invention, an attention is paid to the construction of an oxidation catalyst in order to solve the problem as described above. That is, a basic carrier is used as the carrier for carrying a noble metal for performing the oxidation. Accordingly, the oxidizing ability is suppressed from being lowered when the oxidation catalyst undergoes the SOx poisoning. Thus, it is possible to favorably maintain the reduction efficiency of NOx to be reduced by the aid of a NOx selective reduction catalyst.

In particular, the present invention resides in an exhaust gas purification apparatus for an internal combustion engine; comprising a NOx selective reduction catalyst which is provided in an exhaust passage of the internal combustion engine; an upstream side oxidation catalyst which is a catalyst having an oxidizing ability provided in the exhaust passage upstream, from the NOx selective reduction catalyst and which includes a carrier for carrying a noble metal for oxidation, the carrier being formed of a basic carrier; and a reducing agent supply unit which supplies a reducing agent to an exhaust gas allowed to flow into the NOx selective reduction catalyst.

In relation to the NOx selective reduction catalyst which reduces NOx contained in the exhaust gas to purify the same, it is known that the reduction efficiency varies depending on the ratio between NO and $NO_2$ contained in the exhaust gas. In a general operation state of the internal combustion engine, the ratio between NO and $NO_2$ in the exhaust gas has such a tendency that the proportion occupied by NO becomes large as compared with the ratio to be provided in order to exhibit the satisfactory reduction efficiency. In view of the above, the exhaust gas purification apparatus for the internal combustion engine according to the present invention includes the upstream side oxidation catalyst which is installed on the upstream side from the NOx selective reduction catalyst. Thus, the ratio between NO and $NO_2$ contained in the exhaust gas allowed to flow into the NOx selective reduction catalyst is provided as the ratio at which the satisfactory reduction efficiency is obtained.

Further, the upstream side oxidation catalyst includes the carrier for carrying the noble metal for exhibiting the oxidizing ability, wherein the carrier is formed of the basic carrier. When the basic carrier is adopted as described above, the catalyst is constructed such that the noble metal can be carried in a state of being pulverized more finely into minute particles, and the oxidizing ability thereof can be exhibited effectively. On the other hand, the carrier itself is basic. Therefore, the upstream side oxidation catalyst is formed as the oxidation catalyst in such a state that the oxidizing ability to be originally exhibited by the noble metal is partially suppressed. Although the upstream side oxidation catalyst has the characteristic as described above, it is desirable that the noble metal and the component of the basic carrier are adjusted so that the ratio between NO and $NO_2$ contained in the exhaust gas can be adjusted to such a ratio that the satisfactory reduction efficiency is provided in accordance with the oxidizing ability thereof, when the upstream side oxidation catalyst is incorporated into the exhaust gas purification apparatus for the internal combustion engine according to the present invention. Accordingly, the reducing process for reducing NOx is appropriately performed by the aid of the NOx selective reduction catalyst by using the reducing agent supplied by the reducing agent supply unit.

In this case, when the upstream side oxidation catalyst is poisoned with SOx contained in the exhaust gas discharged from the internal combustion engine, the basic property of the basic carrier as the carrier thereof is lowered. As a result, the oxidizing ability of the noble metal, which has been suppressed by the basic carrier, is activated. That is, in the exhaust gas purification apparatus for the internal combustion engine according to the present invention, the oxidizing ability is conversely activated as the upstream side oxidation catalyst is progressively subjected to the SOx poisoning, wherein the oxidation from NO to $NO_2$ is carried out more efficiently. In the case of the NOx selective reduction catalyst, the more increased the proportion of $NO_2$ occupied in the exhaust gas within a practical range is, the more satisfactory the reduction efficiency is. Based on this fact, when the oxidizing ability of the upstream side oxidation catalyst is activated as described above, it is possible to realize the reduction purification of NOx which is hardly affected by the SOx poisoning. In other words, in the exhaust gas purification apparatus for the internal combustion engine as described above, the upstream side oxidation catalyst is formed so that an oxidizing ability thereof is minimized in a state in which SOx poisoning is not caused as compared with a state in which the SOx poisoning is advanced. Accordingly, the oxidation from NO to $NO_2$ is appropriately maintained. Therefore, it is possible to perform the reduction purification of NOx which is hardly affected by the SOx poisoning, as brought about by the exhaust gas purification apparatus. In the case of any conventional oxidation catalyst, the oxidizing ability of the oxidation catalyst is lowered as the SOx poisoning thereof is progressively advanced. Based on this fact, the activation of the oxidizing ability of the upstream side oxidation catalyst according to the present invention resides in a new knowledge, wherein the effective reduction purification of NOx, which has been never achieved by the conventional technique, is realized.

In this context, the exhaust gas purification apparatus for the internal combustion engine as described above may be constructed to further comprise a poisoning detecting unit which detects or estimates a poisoning amount of the SOx poisoning of the upstream side oxidation catalyst. In this construction, the reducing agent supply unit decreases a supply amount of the reducing agent supplied to the exhaust gas as the SOx poisoning amount of the upstream side oxidation catalyst, which is detected or estimated by the poisoning detecting unit, becomes more increased. As described above, in the upstream side oxidation catalyst according to the present invention, the oxidizing ability, which is provided as the oxidation catalyst, is activated resulting from the decrease in the basic property of the basic carrier as caused by the SOx poisoning. Therefore, the producing ability for producing $NO_2$ is appropriately maintained. As a result, even when the amount of the reducing agent supplied to the NOx selective reduction catalyst is decreased, it is possible to maintain the satisfactory state of the reduction efficiency of NOx therein. Accordingly, it is possible to suppress the amount of the reducing agent consumed when the reduction purification of NOx is performed. Further, it is possible to reduce the possibility of the release to the outside of the reducing agent supplied to the NOx selective reduction catalyst and accumulated therein.

In the exhaust gas purification apparatus for the internal combustion engine as described above, it is possible to adopt, as an example of the reducing agent, at least any one of a compound originating from ammonia, a composition containing ammonia, and fuel for the internal combustion engine. It is also possible to preferably adopt any other reducing agent.

Effect of the Invention

According to the present invention, in the exhaust gas purification apparatus for the internal combustion engine having the oxidation catalyst and the NOx selective reduction catalyst provided in the exhaust passage, it is possible to favorably maintain the reduction efficiency of NOx to be reduced by the aid of the NOx selective reduction catalyst even when the oxidation catalyst causes the SOx poisoning.

MODE FOR CARRYING OUT THE INVENTION

An explanation will be made below with reference to the drawings about the exhaust gas purification apparatus for the internal combustion engine according to an embodiment of the present invention. The construction of the following embodiment is described by way of example. The present invention is not limited to the construction of the embodiment.

First Embodiment

Figure 1:
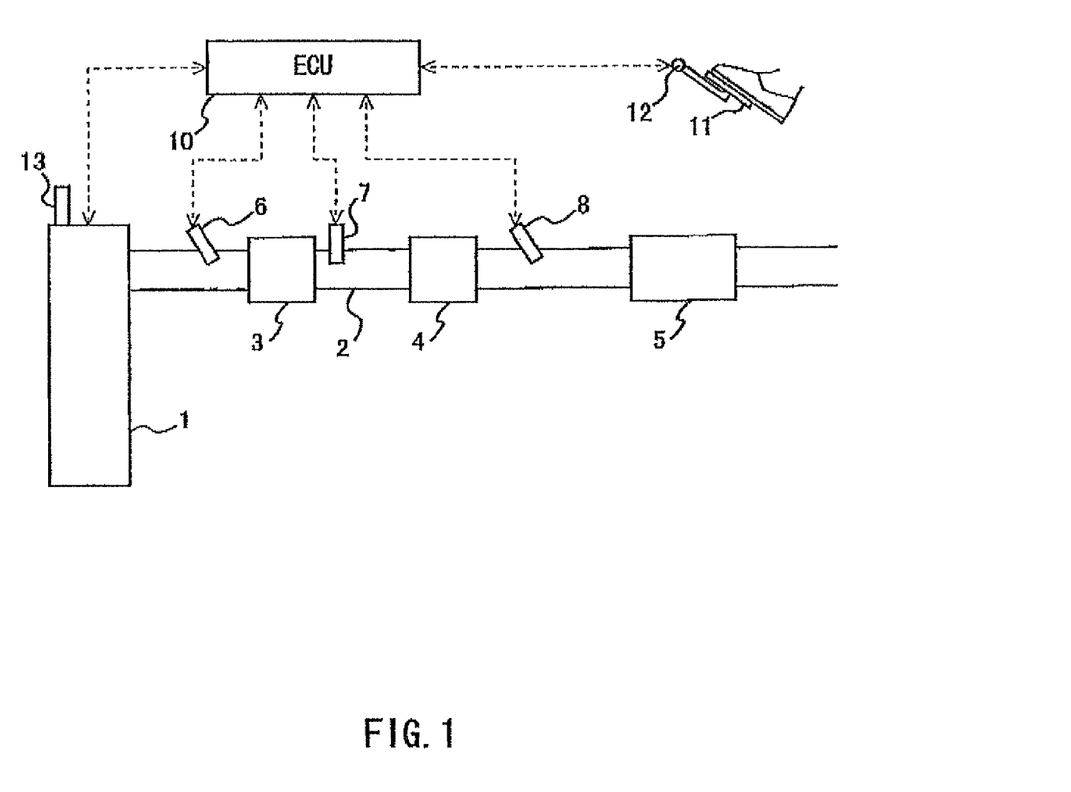
FIG. 1 shows a schematic arrangement of an exhaust gas purification apparatus for an internal combustion engine according to an embodiment of the present invention.

FIG. 1 shows a schematic arrangement of an internal combustion engine and an exhaust gas purification apparatus therefor according to an embodiment of the present invention.

The internal combustion engine 1 shown in FIG. 1 is a four-cycle diesel engine based on a water cooling system having four cylinders. This embodiment adopts the urea SCR system which uses a NOx selective reduction catalyst (hereinafter simply referred to as "NOx catalyst") in order to purify the exhaust gas. In this construction, an exhaust passage 2 is connected to the internal combustion engine 1 in order to exhaust or discharge the exhaust gas. The NOx catalyst 5 as the NOx selective reduction catalyst is installed at an intermediate position of the exhaust passage 2. A filter 4 for trapping the particulate matter (PM) contained in the exhaust gas is installed on the upstream side therefrom, and an oxidation catalyst (corresponding to the upstream side oxidation catalyst according to the present invention) 3 is installed on the more upstream side therefrom.

A urea supply valve 8, which supplies an aqueous urea solution (urea-water solution) into the exhaust gas, is attached to a portion of the exhaust passage 2 disposed on the downstream side from the filter 4 and on the upstream side from the NOx catalyst 5. The urea supply valve 8 is constructed such that the valve is opened in accordance with a signal fed from ECU 10 described later on to inject the aqueous urea solution into the exhaust gas. This construction corresponds to the reducing agent supply unit according to the present invention. The aqueous urea solution, which is supplied from the urea supply valve 8 to the exhaust gas, is hydrolyzed by the heat of the exhaust gas to produce ammonia ($NH_3$) which is adsorbed to the NOx catalyst 5. Adsorbed $NH_3$ reduces NOx contained in the exhaust gas allowed to successively flow into the NOx catalyst 5.

Further, a fuel addition valve 6, which adds the fuel for the internal combustion engine 1 into the exhaust gas, is installed to the exhaust passage 2 upstream from the oxidation catalyst 3. The valve is opened in accordance with a signal fed from ECU 10 to inject the fuel (HC) into the exhaust gas in this construction. The fuel, which is added to the exhaust gas by the fuel addition valve 6, is oxidized by the aid of the oxidation catalyst 3, and thus the exhaust gas temperature is raised. Accordingly, the combustion of PM trapped by the filter 4 is facilitated to contemplate the so-called regeneration of the trapping function of the filter 4 (hereinafter referred to as "filter regeneration"). Further, a temperature sensor 7, which detects the temperature of the exhaust gas discharged from the oxidation catalyst 3, is installed on the downstream side from the oxidation catalyst 3. The temperature sensor 7 is electrically connected to ECU 10 so that a detected value thereof is delivered to ECU 10.

ECU 10, which is an electronic control unit for controlling the internal combustion engine 1, is provided in combination with the internal combustion engine 1 constructed as described above. ECU 10 is the unit which controls the operation state of the internal combustion engine 1 in accordance with an operation condition of the internal combustion engine 1 and a request of a driver. A control program is executed by ECU 10, and thus a variety of processes, which are required to purify the exhaust gas of the internal combustion engine 1, are realized. In addition to the sensor as described above, those connected via electric wiring lines to ECU 10 also include an accelerator opening degree sensor 12 which outputs an electric signal corresponding to the pedaling amount of an accelerator pedal 11 pedaled by the driver to detect the engine load, and a crank position sensor 13 which detects the engine rotational speed. Output signals of various sensors as described above are inputted into ECU 10. ECU 10 can grasp the operation state of the internal combustion engine 1 (for example, the fluctuation of the load and the fluctuation of the rotational speed) based on the input signals.

In general, the NOx reduction reactions, which are performed by the aid of the NOx catalyst 5, are as follows.

$$6NO_2+8NH_3 \rightarrow 7N_2+12H_2O \quad \text{Formula (1)}$$

$$4NO+4NH_3+O_2 \rightarrow 4N_2+6H_2O \quad \text{Formula (2)}$$

$$NO+NO_2+2NH_3 \rightarrow 2N_2+3H_2O \quad \text{Formula (3)}$$

Among the reduction reactions of NOx described above, the reduction reaction represented by Formula (3) is performed at a relatively low temperature. Therefore, this reaction is a preferred reduction reaction in order to efficiently purify NOx. According to the reaction represented by Formula (3), equal amounts of NO and $NO_2$ are theoretically reduced. In other words, the reduction efficiency of NOx is maximized when the ratio between NO and $NO_2$ is 1:1 within a temperature range in which the reaction represented by Formula (3) is principally caused. Therefore, the oxidizing ability is determined in relation to the oxidation catalyst 3 in order to oxidize NO contained in the exhaust gas into $NO_2$ so that the ratio between NO and $NO_2$ approaches 1:1 as closely as possible.

In this case, the oxidation catalyst 3 is formed such that the noble metal, which exhibits the oxidizing ability, is carried on the basic carrier. Specifically, the noble metal, which is exemplified, for example, by Pt, Pd, and Rh, is carried on the carrier which exhibits the basic property and which is exemplified, for example, by $Ba_xAl_yO_z$, $Mg_xAl_yO_z$, $Ce_xAl_yO_z$, and $La_xSi_yO_z$ (values of x, y, z in respective carriers are values which are not zero), and thus the oxidation catalyst 3 is formed. The basic carrier as described above has such an effect that the noble metal, which is provided to exhibit the oxidizing ability, is carried in a state of being pulverized into minute particles. On the other hand, the entire oxidation catalyst is in such a state that the oxidizing ability thereof is suppressed, because the carrier itself is basic. Therefore, in the oxidation catalyst 3, for example, the values of the composition ratios x, y, z in the four types of the exemplified carriers are appropriately adjusted so that the ratio between NO and $NO_2$ contained in the exhaust gas allowed to flow into the oxidation catalyst 3 may be 1:1 as favorably as possible in relation to the oxidizing ability which is in the state of being suppressed by the basic property of the carrier.

In the oxidation catalyst 3 constructed as described above, the SOx poisoning is advanced in a time-dependent manner by being exposed to the exhaust gas, and the basic property is lowered on the surface of the carrier. In this case, the noble metal is carried in the vicinity of the surface of the basic carrier. Therefore, when the SOx poisoning is progressed in the oxidation catalyst 3, the oxidizing ability, which is brought about by the noble metal, is consequently activated.

Figure 2:
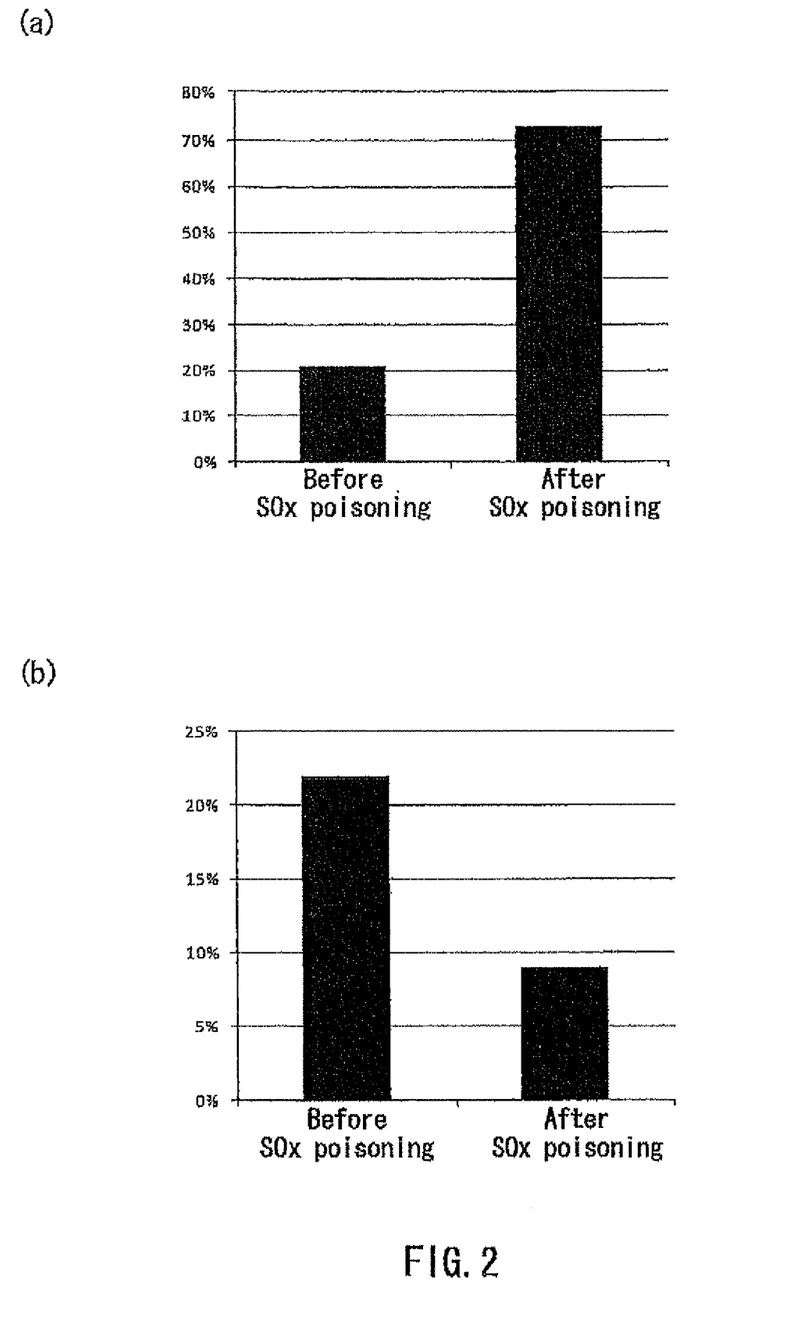
FIG. 2 shows the change of the oxidizing ability before and after the SOx poisoning, in relation to an oxidation catalyst used for the exhaust gas purification apparatus for the internal combustion engine.

In this context, FIG. 2 shows the change of the oxidizing ability of the oxidation catalyst 3 before and after the SOx poisoning in relation to the oxidation catalyst 3 described above. The upper part (a) of FIG. 2 shows the change of the oxidizing ability provided in the oxidation catalyst according to the present invention, specifically the change of the oxidizing ability brought about when the carrier is $Mg_xAl_yO_z$ and the carried noble metal is Pt. The vertical axis of the drawing represents the value of the oxidation efficiency of the oxidation from NO to $NO_2$ to indicate the oxidizing ability, as obtained by an experiment performed by the applicant. In the drawing, the phrase "after SOx poisoning" represents a certain SOx poisoning state obtained when the oxidation catalyst 3 is continuously exposed to the exhaust gas for a predetermined period of time. The SOx poisoning state in the oxidation catalyst 3 changes depending on the exposure time.

Therefore, the presentation shown in FIG. 2 (a) resides in the change of the oxidizing ability in the SOx poisoning state brought about by being exposed to the exhaust gas for a certain period of time by way of example in every sense. In this way, the oxidizing ability is raised in the oxidation catalyst 3 in accordance with the advance of the SOx poisoning. It is noted that the tendency, in which the oxidizing ability is raised in accordance with the progress or advance of the SOx poisoning, has been also found out in relation to the basic carriers based on, for example, $Ba_xAl_yO_z$, $Ce_xAl_yO_z$, and $La_xSi_yO_z$ other than $Mg_xAl_yO_z$ in the same manner as described above.

On the contrary, the lower part (b) of FIG. 2 shows the change of the oxidizing ability before and after the SOx poisoning in an oxidation catalyst constructed such that the noble metal is carried by a non-basic carrier generally adopted in the conventional technique. As shown in the drawing, the oxidizing ability is progressively lowered in accordance with the advance of the SOx poisoning in the oxidation catalyst concerning the conventional technique. As a result, the oxidation reaction from NO to $NO_2$ is not performed satisfactorily, and the ratio between NO and $NO_2$, which is provided in the exhaust gas allowed to finally flow into the NOx catalyst 5, is separated from the value at which it is possible to expect the preferred reduction reaction of NOx.

Figure 3:
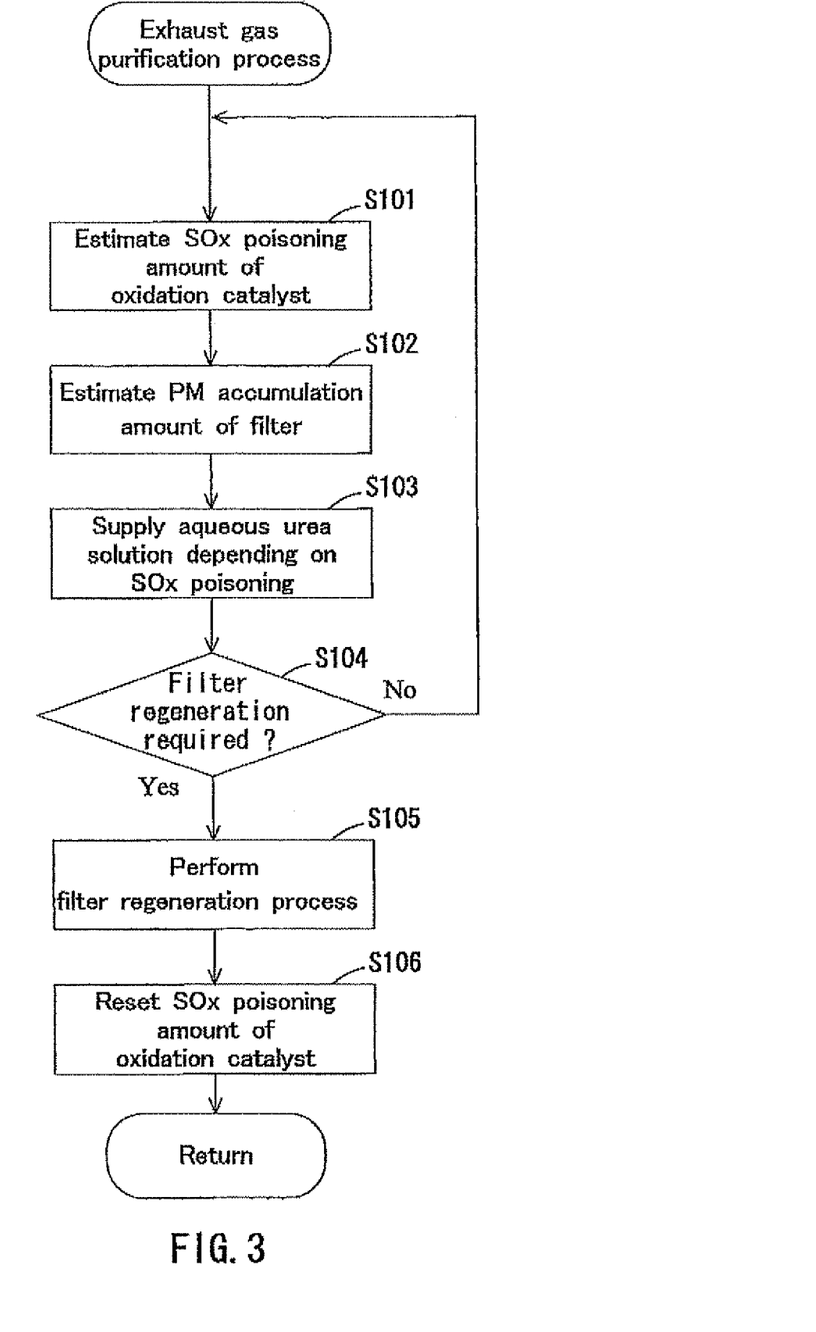
FIG. 3 shows a flow chart of the process for purifying the exhaust gas, executed by the exhaust gas purification apparatus for the internal combustion engine shown in FIG. 1.

Accordingly, in the exhaust gas purification apparatus for the internal combustion engine 1 according to the present invention, the reduction purification of NOx is realized based on the knowledge about the change of the oxidizing ability of the oxidation catalyst 3 having been unknown in the conventional technique as described above, i.e., the knowledge about the activation of the oxidizing ability in accordance with the progress or advance of the SOx poisoning in the oxidation catalyst 3. Specifically, the exhaust gas purification process shown in FIG. 3 is executed by ECU 10. In principle, the exhaust gas purification process is repeatedly executed during the period in which the internal combustion engine 1 is operated.

At first, in S101, the SOx poisoning amount of the oxidation catalyst 3 is estimated. For example, the total amount of the exhaust gas discharged from the internal combustion engine 1 is calculated based on, for example, the load fluctuation of the internal combustion engine 1 and the elapsed time from the reset by using the reset in S106 as the starting point as described later on, and the SOx poisoning amount accumulated in the oxidation catalyst 3 is estimated based on the exhaust gas total amount. In particular, ECU 10 has a control map in which the exhaust gas total amount and the SOx poisoning amount in the oxidation catalyst 3 are correlated with each other. The SOx poisoning amount of the oxidation catalyst 3 is estimated by making access to the map. Another method is also available as follows. That is, a predetermined amount of the fuel is added to the exhaust gas from the fuel addition valve 6 in order to estimate the SOx poisoning amount of the oxidation catalyst 3, and the increase in temperature of the exhaust gas, which is caused in the oxidation catalyst 3, is detected by the temperature sensor 7. Accordingly, the change of the oxidizing ability of the oxidation catalyst 3, i.e., the SOx poisoning amount in the oxidation catalyst 3 is estimated. The process based on S101 corresponds to the poisoning detecting unit according to the present invention. If the process in S101 is completed, the routine proceeds to S102.

In S102, the accumulation amount of PM in the filter 4 is estimated. For example, the total amount of the exhaust gas discharged from the internal combustion engine 1 is calculated based on, for example, the load fluctuation of the internal combustion engine 1 and the elapsed time from the point in time of the completion by using the starting point of the completion of the filter regeneration process in S105 as described later on. The amount of PM trapped by the filter 4 is estimated based on the total amount of the exhaust gas. If the process in S102 is completed, the routine proceeds to S103.

Figure 4:
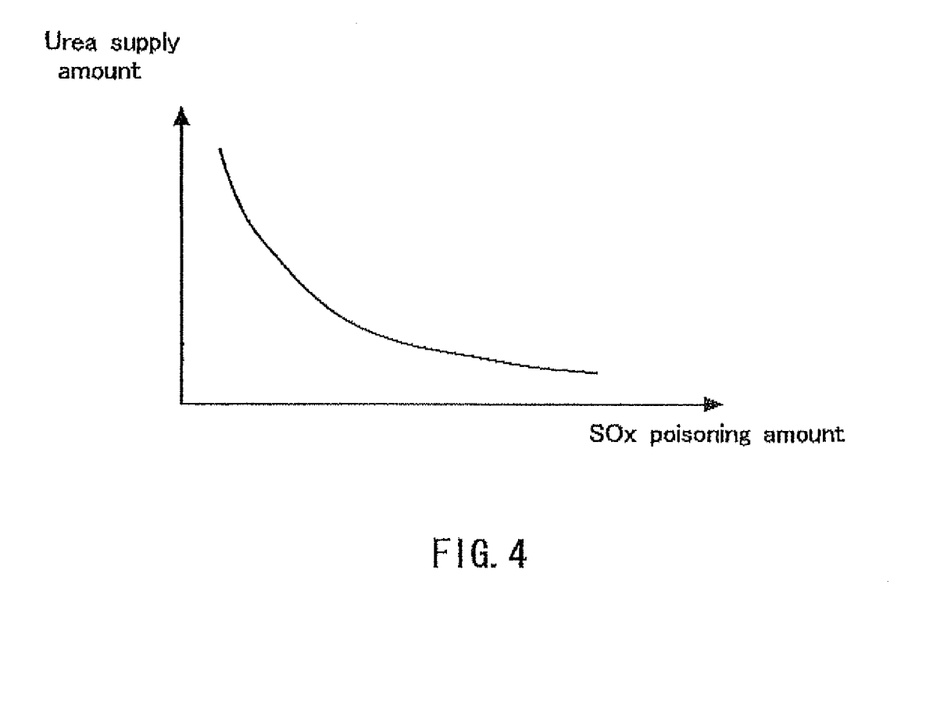
FIG. 4 shows the transition or change of the supply amount in relation to the urea supply carried out in the exhaust gas purification process shown in FIG. 3.

In S103, the aqueous urea solution is supplied from the urea supply valve 8 to the exhaust gas depending on the SOx poisoning amount of the oxidation catalyst 3 estimated in S101. As described above, the oxidation catalyst 3 according to the present invention exhibits the characteristic such that the oxidizing ability as provided by the oxidation catalyst is more activated as the SOx poisoning is advanced therein. Accordingly, the aqueous urea solution is supplied in S103 so that the urea supply amount is more decreased in amount as the SOx poisoning amount of the oxidation catalyst 3 is more increased as shown in FIG. 4. In the case of the oxidation catalyst concerning the conventional technique (oxidation catalyst having the characteristic shown in FIG. 2 (b)), the oxidation reaction from NO to $NO_2$ is hardly performed as the SOx poisoning is more advanced. As a result, the reduction efficiency of NOx is progressively lowered in the NOx catalyst. However, in the case of the oxidation catalyst 3 according to the present invention, the oxidizing ability of the oxidation catalyst 3 is more activated in accordance with the advance of the SOx poisoning. Therefore, unlike the conventional technique, the deterioration of the reduction efficiency of NOx in the NOx catalyst 5 is avoided. On the contrary, the producing ability for producing $NO_2$ is appropriately maintained owing to the activation of the oxidizing ability as the SOx poisoning is advanced. Therefore, the NOx reduction reaction, which follows Formula (3) described above, is maintained more appropriately in the NOx catalyst 5. As a result, even when the amount of the aqueous urea solution supplied from the urea addition valve 8 to the exhaust gas is decreased, it is possible to sufficiently cause the NOx reduction reaction in the NOx catalyst 5. If the process in S103 is completed, the routine proceeds to S104.

In S104, it is judged whether or not the regeneration process is required for the filter 4 based on the accumulation amount of PM in the filter 4 estimated in S102. Specifically, if the estimated PM accumulation amount exceeds a reference accumulation amount, the affirmative judgment is made such that the regeneration process is required. If the estimated PM accumulation amount does not exceed the reference accumulation amount, the negative judgment is made such that the regeneration process is not required. If the affirmative judgment is made in S104, the routine proceeds to S105. If the negative judgment is made, the processes in S101 and the followings are repeated.

In S105, as for the filter regeneration process, a predetermined amount of the fuel is added from the fuel addition valve 6 to the exhaust gas, and the increase in the exhaust gas temperature is executed for the oxidation catalyst 3 to oxidize and remove PM accumulated in the filter 4. If the process in S105 is completed, the routine proceeds to S106. In S106, the SOx poisoning amount in the oxidation catalyst 3 is reset for the execution in S101, and then the processes in S101 and the followings are performed again. The process in S106 is performed while taking the following fact into consideration. That is, when the filter regeneration process is performed in S105, then the temperature of the oxidation catalyst 3 itself is also raised on account of the oxidation of the fuel in the oxidation catalyst 3 caused by the fuel addition, and the SOx poisoning state in the oxidation catalyst 3 disappears through this process. Therefore, in the exhaust gas purification apparatus for the internal combustion engine 1 according to the present invention, the regeneration process is performed for the filter 4, and the restoration from the SOx poisoning of the oxidation catalyst 3 is performed as well. Based on this fact, the SOx poisoning amount of the oxidation catalyst 3 is reset, which determines the supply amount of the aqueous urea solution in order to perform the steady reduction purification of NOx by the aid of the NOx catalyst 5. Accordingly, it is possible to supply the aqueous urea solution more correctly when the processes in S101 and the followings are performed again.

Figure 5:
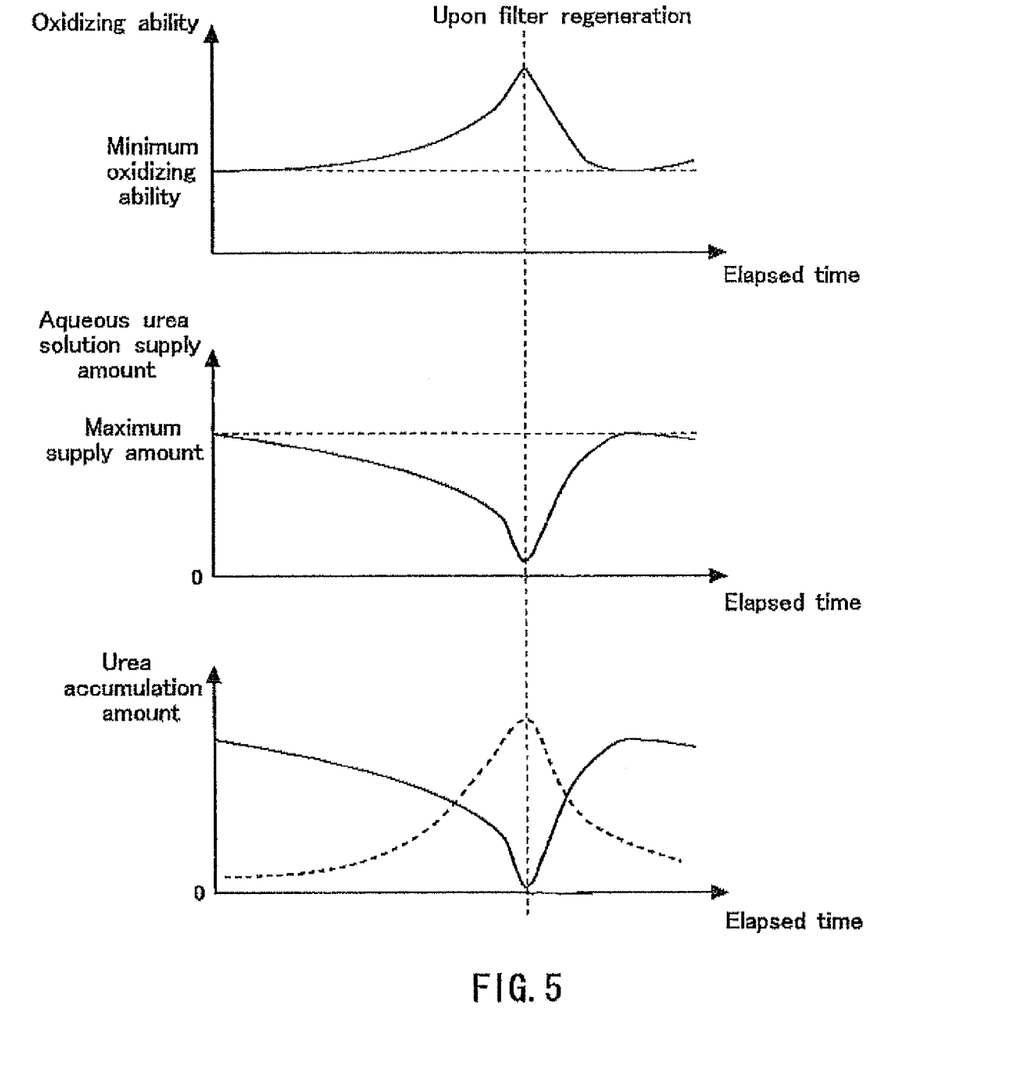
FIG. 5 shows the transition or change of the oxidizing ability of the oxidation catalyst, the urea supply amount, and the urea accumulation amount in a NOx selective reduction catalyst, brought about when the exhaust gas purification process shown in FIG. 3 is carried out.

In this context, FIG. 5 shows, with solid lines, the transition or change of the oxidizing ability of the oxidation catalyst 3, the transition or change of the supply amount of the aqueous urea solution by the urea supply valve 8, and the transition or change of urea accumulated in the oxidation catalyst 3, while being conformed to the same time axis, when the exhaust gas purification process shown in FIG. 3 is executed. The timing, which is referred to as "upon filter regeneration" in FIG. 5, is the timing at which the process in S105 in the exhaust gas purification process is started. The oxidizing ability, which is provided in such a state that the SOx poisoning is not caused yet in the oxidation catalyst 3, is referred to as the minimum oxidizing ability. In the case of the oxidation catalyst 3, the SOx poisoning is advanced and the oxidizing ability thereof is progressively raised, as the operation time of the internal combustion engine 1 elapses. Corresponding to the transition or change of the oxidizing ability, the amount of the aqueous urea solution, which is supplied from the urea supply valve 8 to the exhaust gas, has the maximum supply amount in the state in which the SOx poisoning is not caused yet in the oxidation catalyst 3, and the supply amount is progressively decreased as the operation time of the internal combustion engine 1 elapses. The supply amount is minimized upon the filter regeneration. In this way, even when the supply amount of the aqueous urea solution is gradually decreased, the reduction efficiency of NOx reduced by the aid of the NOx catalyst 5 can maintained in the favorable state, which is affirmed as described above.

When the transition or change of the supply amount of the aqueous urea solution is provided as described above, the amount of urea, which is progressively accumulated in the NOx catalyst 5, is gradually decreased to that provided upon the filter regeneration, while the reduction efficiency of NOx reduced by the aid of the NOx catalyst 5 is appropriately maintained. As a result, the urea, which is accumulated in the NOx catalyst 5, can be reliably suppressed from flowing to the downstream side thereof.

In the case of the oxidation catalyst concerning the conventional technique (oxidation catalyst exhibiting the characteristic as shown in FIG. 2 (b)), the supply amount of the aqueous urea solution supplied to the exhaust gas is increased in amount as the oxidizing ability thereof is more lowered. Therefore, as depicted by a broken line at the lower part of FIG. 5, the urea amount accumulated in the NOx catalyst is extremely increased upon the filter regeneration, and the urea may highly possibly flow to the downstream side. Based on this point, it is affirmed that the exhaust gas purification apparatus for the internal combustion engine 1, in which the NOx catalyst 5 is adopted together with the oxidation catalyst 3 according to the present invention, makes it possible to perform the useful exhaust gas purification having been incapable of being found in the conventional technique.

In the embodiment described above, the aqueous urea solution is used for the reducing agent for reducing NOx in the NOx catalyst 5. However, the fuel of the internal combustion engine 1 may be used as the reducing agent in place thereof, provided that the effective NOx reduction can be performed in the NOx catalyst 5.

In the exhaust gas purification apparatus for the internal combustion engine 1 shown in FIG. 1, the oxidation catalyst 3 may be grasped while principally paying an attention to the fact that PM trapped by the filter 4 is oxidized and removed. That is, as for the oxidation catalyst 3, the oxidizing ability thereof is activated as the SOx poisoning is progressively advanced. Therefore, NO contained in the exhaust gas is efficiently oxidized into $NO_2$, and a larger amount of $NO_2$ can be supplied to the filter 4. As a result, PM trapped by the filter 4 can be effectively oxidized and removed with $NO_2$. It is possible to delay or retard the decrease in the ability to trap PM by the filter 4. In this way, it is affirmed that the oxidation catalyst 3 according to the present invention is useful from the viewpoint of the maintenance of the ability of the filter 4 to trap PM as well.

If it is considered that the degree of contribution of the oxidation catalyst 3 is large with respect to the maintenance of the ability of the filter 4 to trap PM as described above, it is also allowable to estimate the PM amount accumulated in the filter 4, based on the amount subjected to the oxidation and the removal with $NO_2$ fed from the oxidation catalyst 3 in the process in S102 in the exhaust gas purification process shown in FIG. 3. Accordingly, it is possible to execute the filter regeneration process in S105 at an appropriate timing.

PARTS LIST

1: internal combustion engine, 2: exhaust passage, 3: oxidation catalyst (upstream side oxidation catalyst), 4: filter, 5: NOx catalyst (NOx selective reduction catalyst), 6: fuel addition valve, 7: temperature sensor, 8: urea supply valve, 10: ECU, 11: accelerator pedal, 12: accelerator opening degree sensor, 13: crank position sensor.

The invention claimed is:
1. An exhaust gas purification apparatus for an internal combustion engine, comprising:
    a NOx selective reduction catalyst which is provided in an exhaust passage of an internal combustion engine;
    an upstream side oxidation catalyst which is a catalyst having an oxidizing ability provided in the exhaust passage upstream from the NOx selective reduction catalyst and which includes a carrier for carrying a noble metal for oxidation, the carrier being formed of a basic carrier;
    a reducing agent supply unit which supplies a reducing agent to an exhaust gas allowed to flow into the NOx selective reduction catalyst, wherein:
        the upstream side oxidation catalyst is formed so that an oxidizing ability thereof is minimized in a state in which SOx poisoning is not caused as compared with a state in which the SOx poisoning is advanced: and
    an electronic control unit that is configured to detect or estimate a poisoning amount of the SOx poisoning of the upstream side oxidation catalyst, wherein;
        the electronic control unit is configured to cause a decrease in a supply amount of the reducing agent supplied to the exhaust gas as the SOx poisoning amount of the upstream side oxidation catalyst, which is detected or estimated by the electronic control unit, becomes more increased.
2. The exhaust gas purification apparatus for the internal combustion engine according to claim 1, wherein the reducing agent is at least any one of a compound originating from ammonia, a composition containing ammonia, and fuel for the internal combustion engine.

* * * * *